Dec. 3, 1968　　　M. A. FRANK, SR　　　3,413,889
ARBOR FOR CIRCULAR CUTTERS
Filed Oct. 18, 1966

INVENTOR.
Milton A. Frank, Sr.
BY Harry M. Saragovitz,
Edward J. Kelly, Herbert Berl
& Muzio B. Roberto
ATTORNEYS United States Patent Office 3,413,889
Patented Dec. 3, 1968

3,413,889
ARBOR FOR CIRCULAR CUTTERS
Milton A. Frank, Sr., Frederick, Md., assignor to the United States of America as represented by the Secretary of the Army
Filed Oct. 18, 1966, Ser. No. 588,248
4 Claims. (Cl. 90—11)

The invention described herein may be manufactured and used by or for the Government of the United States of America for Governmental purposes without the payment to me of any royalty thereon.

This invention relates in general to an arbor and more particularly to an arbor on which a revolving cutting tool is mounted and secured.

Cutter arbors with spindle ends are standard equipment in machine shops for mounting metal splitting saws and for screw slotting. The arbors usually have a keyed shaft providing a positive drive for the circular blade. With the key in place, the holding nut may be tightened with the fingers. But when the key is not in place or when the arbor has no keyway, a wrench must be used to get a tight grip between the spacer and cutter blade.

In general purpose machine shops, an arbor with circular cutting blades may be used in a variety of machines. Generally, these arbors are longer and of a more rugged construction than is necessary for light duty work with narrow cutter and splitter blades. The protruding shaft of even the shorter length arbors will at times interfere with a cutting operation and require repositioning of the work while it is positioned beneath the shaft. With an arbor having a long shaft, interference is more frequent. In addition, there is a tendency for the tool to whip at high operation speeds. This necessitates the monitoring of the non-cutting end of the shaft in a collet.

The present invention comprises an arbor and a counter bored cap-screw. The arbor component comprises a straight shank in combination with a flange section. Positioned within the flange section is a spring loaded plunger which protrudes therefrom and engages the slotted cutting tool. When assembled the spring loaded plunger automatically protrudes the appropriate length in the assembled tool with the cutter blade.

The present tool with straight shank mounting can be used in any piece of shop equipment with plain rotary chuck, such as a lathe, drill press, radial drill, and milling machine.

A unique feature of this invention is the spring loaded plunger which provides a positive drive for standard circular blades with slotted openings. The cutting blade may be readily inserted or removed. The cap-screw can be tightened by the utilization of the fingers, no wrench being required, thereby facilitating the insertion or removal thereof from the arbor.

It is an object of the invention to provide and disclose an arbor cutter assembly suitably contoured to receive a cutter.

It is a further object of the invention to provide and disclose an arbor cutter assembly whereby the insertion and removal of the cutting tool is expeditiously accomplished.

It is a further object of the invention to provide and disclose an arbor cutter assembly of simple design.

It is a further object of the invention to provide and disclose an arbor cutter assembly comprising a short shaft thereby minimizing interference of the arbor cutter assembly with the work piece.

It is a further object of the invention to provide and disclose an arbor cutter assembly comprising a short shaft thereby minimizing the tendency of the tool to whip at high speeds.

It is a further object of the invention to provide and disclose an arbor cutter assembly which automatically adjusts to the thickness of the cutting tool.

Other objects and a fuller understanding of the invention may be had by referring to the following description and claims taken in conjunction with the accompanying drawing in which:

Figure 1:
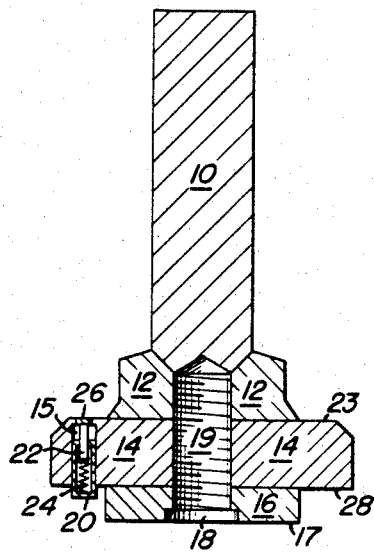
FIG. 1 shows an elevated sectional view of the arbor.
Figure 2:
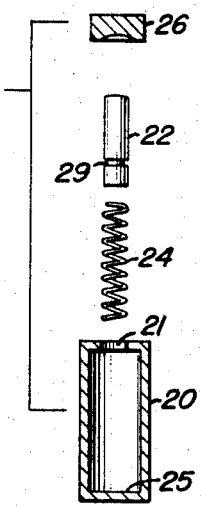
FIG. 2 shows an exploded view of the spring loaded plunger assembly of the arbor cutter assembly.
Figure 4:
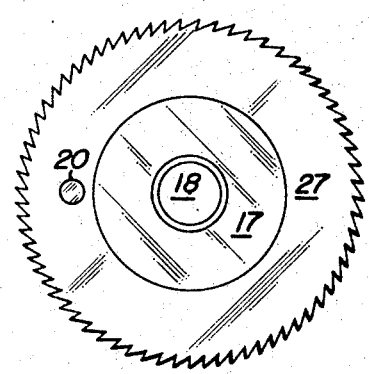
FIG. 4 shows a bottom view of the tool mounting section of the arbor, with a circular cutting tool positioned thereon.

Referring now to FIG. 1 of the drawing, the arbor comprises cylindrical shaft or spindle section 10 connected to a base section 12. Extending outwardly from the base and immediately adjacent theerto is cylindrical flared section 14, which comprises sides 23 and 28. Immediately adjacent to flared section 14, is reduced section 16. The reduced section forms a shoulder which is suitably contoured to receive a cutting tool, e.g., circular cutting tool 27 as shown in FIG. 4. Extending axially through reduced section 16, flared section 14 and base 12 from flat surface 17 of reduced section 16, is a bore comprising unthreaded section 18 and threaded section 19. Extending axially from the surface of side 28 of flared section 14 to a point near the surface of side 23, from a point near reduced section 16, is bore 15. Positioned within the bore is a spring loaded plunger assembly which comprises moveable sleeve 20, stationary plunger rod 22, coil spring 24, and plunger rod support 26. Sleeve 20, which comprises a cylindrical configuration, is partially encompassed within flared section 14. The sleeve contains opening 21 of a size sufficient to admit a portion of plunger rod 22 which is partially encompassed by spiral spring 24. The upper portion of the spring, which encompasses the lower portion of plunger rod 22 is secured thereto by any suitable manner, e.g., groove 29 extending circumferentially thereon. The lower portion of the spring abuts interior bottom 25 of sleeve 20. When a force is applied to the exterior bottom of sleeve 20, a compressional force is exerted on coil spring 24, thereby actuating moveable sleeve 20 upwardly in bore 15 along stationary plunger rod 22.

Figure 3:
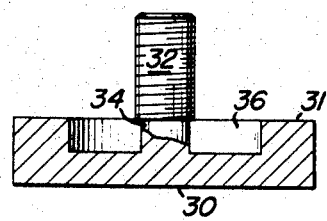
FIG. 3 shows a elevated sectional view of the cap-screw component of the arbor cutter assembly.

Cutting tool 27 is secured to the arbor shown in FIG. 1 by means of the cap-screw shown in FIG. 3. The cap-screw comprises hexagonal shaped head 30 having lip 31, thereby forming grove 36. The grove is suitably contoured to be compatible with reduced section 16 of the arbor. Protruding from the center of grove 36 is a cylindrical stem comprising threaded portion 32 and unthreaded portion 34. Threaded portion 32 and unthreaded portion 34, respectively, of the cap screw are suitably contoured to be compatible with threaded portion 19 and unthreaded portion 18 of the bore of the arbor. The device is loaded by inserting circular cutting tool 27 comprising a slot on reduced portion 16 of the arbor with the slot of the circular cutting tool engaging sleeve 20 of the spring loaded plunger assembly. The cap-screw is then inserted by screwing the threaded stem 32 into threaded bore 19 of the arbor cutter. When the cap-screw is sufficiently tightened, the surface of lip 31 contacts sleeve 20 of the spring loaded plunger assembly which is protruding through the slot of the circular cutter as shown in FIG. 4. Thus compressional force is applied to moveable sleeve 20 of the spring loaded plunger assembly thereby actuating the sleeve in a upward direction until the surface of lip 31 contacts the surface of the circular cutter. The arbor cutter is now fully assembled and ready for operations.

Illustrative, but without limitation, the arbor cutter assembly for circular saws and cutters within the scope of this invention comprises; a spindle and tool mounting section 29/32" in length and 1 3/8" in width at the flared section; a cap-screw 3/4" in length and 1 13/32" in width.

Although I have described my invention with a certain degree of particularity, it is understood that the present disclosure has been made by way of example and that numerous changes in the details of construction and the combination and arrangement of parts may be resorted to without departing from the spirit and the scope of the invention as hereinafter claimed.

Having described my invention, I claim:

1. An arbor cutter assembly comprising a straight shank, said shank having a base co-axial therewith, said base including a flanged portion and a reduced section extending from the face of said flanged portion, a partially threaded bore extending axially through at least a portion of said base, a cutting tool having a central opening and being mounted on said reduced section, spring loaded retractable plunger means protruding from said flanged section, said cutting tool having means engaging said plunger means to prevent the cutting tool from rotating on said reduced section, fastening means received in said threaded bore for securing the cutting tool to said base and for retracting said plunger means so that it does not protrude beyond the thickness of the cutting tool.

2. An arbor cutter assembly in accordance with claim 1 wherein the cutting tool comprises a circular saw.

3. An arbor cutter assembly in accordance with claim 1 wherein the fastening means comprises a cap-screw.

4. An arbor cutter assembly in accordance with claim 1 wherein the engaging means of the cutting tool comprises a slot.

References Cited

UNITED STATES PATENTS

| | | | |
|---|---|---|---|
| 559,012 | 4/1896 | Warren | 90—11.1 |
| 2,981,300 | 4/1961 | Peterson et al. | 287—53 X |
| 2,992,788 | 7/1961 | Hardison | 287—53 X |

FOREIGN PATENTS 215,138  10/1960  Austria.

ANDREW R. JUHASZ, *Primary Examiner.*

G. WEIDENFELD, *Assistant Examiner.*